US012766778B2

(12) United States Patent
Geltinger et al.

(10) Patent No.: US 12,766,778 B2
(45) Date of Patent: Oct. 20, 2026

(54) ASEPTIC BLOW MOLD WITH REAR EXHAUST GAS CHANNELS, AND METHOD FOR FORMING CONTAINERS UNDER ASEPTIC CONDITIONS

(71) Applicant: KRONES AG, Neutraubling (DE)

(72) Inventors: Florian Geltinger, Donaustauf (DE); Juergen Soellner, Beratzhausen (DE)

(73) Assignee: KRONES AG, Neutraubling (DE)

( * ) Notice: Subject to any disclaimer, the term of this patent is extended or adjusted under 35 U.S.C. 154(b) by 147 days.

(21) Appl. No.: 18/237,852

(22) Filed: Aug. 24, 2023

(65) Prior Publication Data

US 2024/0066785 A1 Feb. 29, 2024

(30) Foreign Application Priority Data

Aug. 24, 2022 (DE) ..................... 10 2022 121 447.8

(51) Int. Cl.
*B29C 49/62* (2006.01)
*B29C 49/46* (2006.01)
(Continued)

(52) U.S. Cl.
CPC .............. *B29C 49/62* (2013.01); *B29C 49/46* (2013.01); *B29C 49/48* (2013.01);
(Continued)

(58) Field of Classification Search
CPC ......... B29C 49/62; B29C 49/46; B29C 49/48; B29C 2049/622; B29L 2031/712
See application file for complete search history.

(56) References Cited

U.S. PATENT DOCUMENTS 9,636,863 B2 * 5/2017 Geltinger ................ B29C 49/70
2004/0202745 A1 10/2004 Tsau et al. .................... 425/522
(Continued)

FOREIGN PATENT DOCUMENTS

DE 102013226906 7/2015 ............. B29C 49/48
DE 102014107512 12/2015 ............. B29C 49/48
(Continued)

OTHER PUBLICATIONS

Extended European Search Report issued in EP Patent Appln. No. 23191883.0, dated Mar. 26, 2024, with machine English translation, 14 pages.

(Continued)

*Primary Examiner* — Alison L Hindenlang
*Assistant Examiner* — Shibin Liang
(74) *Attorney, Agent, or Firm* — HAYES SOLOWAY P.C.

(57) ABSTRACT

Disclosed is a blow mold for shaping plastic preforms into containers having a first and second side part, which are movable relative to one another and, in an assembled state, enclose a cavity at least in sections, within which a plastic preform can be expanded to form a plastic container, wherein the first and/or second side part has at least one channel configured for conveying fluids and extends from an inner surface defining the cavity to an opposite outside surface, and a second channel connected to the first channel extending in sections along the outside surface of the first and/or second side part, wherein the first and/or second channel in a state of the blow mold, in which shaping of a plastic preform into a plastic container within the blow mold is possible, is in fluid connection with a clean room at least on one side.

9 Claims, 2 Drawing Sheets

Figure 1:
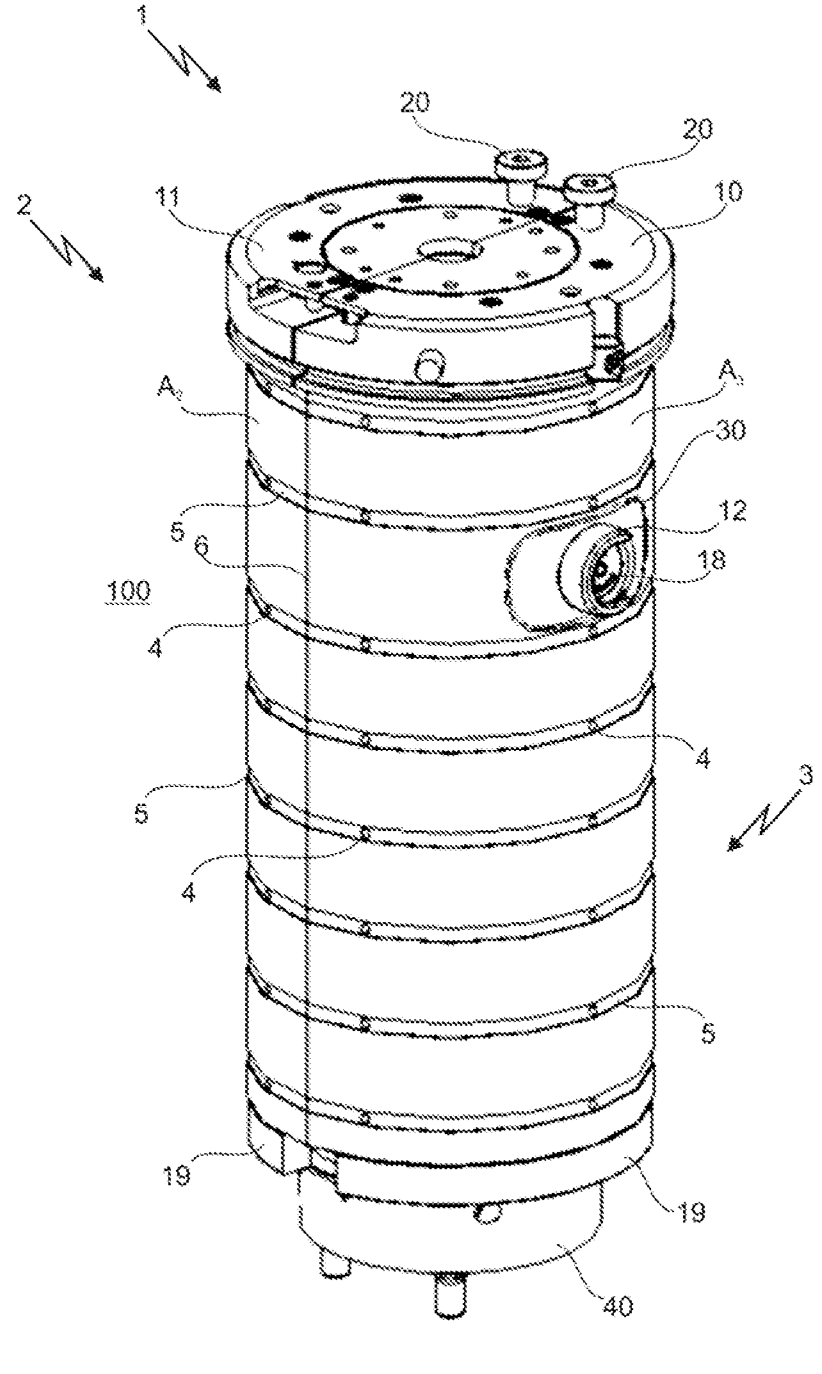

(51) Int. Cl.
*B29C 49/48* (2006.01)
*B29L 31/00* (2006.01)

(52) U.S. Cl.
CPC *B29C 2049/4673* (2013.01); *B29C 2049/622* (2013.01); *B29L 2031/712* (2013.01)

(56) References Cited

U.S. PATENT DOCUMENTS

| | | | | |
|---|---|---|---|---|
| 2004/0202746 | A1* | 10/2004 | Tsau | B29C 49/62 425/522 |
| 2012/0161349 | A1 | 6/2012 | Pasquier et al. | 264/39 |
| 2014/0305076 | A1 | 10/2014 | Winzinger | 53/201 |
| 2015/0145178 | A1* | 5/2015 | Blochmann | B29C 49/46 425/538 |
| 2015/0343696 | A1 | 12/2015 | Geltinger et al. | B29C 49/30 |
| 2016/0067904 | A1 | 3/2016 | Eleftheriou et al. | B29C 49/62 |
| 2019/0009449 | A1 | 1/2019 | Kindl et al. | B29C 49/48 |
| 2019/0047205 | A1 | 2/2019 | Parrinello et al. | B29C 49/62 |
| 2021/0094219 | A1 | 4/2021 | Geltiner | B29C 49/48 |

FOREIGN PATENT DOCUMENTS

| | | | |
|---|---|---|---|
| DE | 102015122324 | 6/2017 | B29C 49/42 |
| DE | 102018131396 | 6/2020 | B29C 49/46 |
| JP | H07323471 | 12/1995 | B29C 49/62 |
| WO | 2018189300 | 10/2018 | B29C 49/48 |

OTHER PUBLICATIONS

Partial European Search Report issued in EP Patent Appln. No. 23191883.0, dated Dec. 6, 2023, with machine English translation, 15 pages.
Search Report issued in German Patent Appln. Serial No. 10 2022 121 447.8, dated Mar. 9, 2023, with machine English translation, 8 pages.

* cited by examiner

ASEPTIC BLOW MOLD WITH REAR EXHAUST GAS CHANNELS, AND METHOD FOR FORMING CONTAINERS UNDER ASEPTIC CONDITIONS

BACKGROUND OF THE INVENTION

The present invention relates to a blow mold for shaping plastic preforms into plastic containers having a first side part and a second side part, which are movable relative to one another and, in an assembled state, enclose a cavity at least in sections, within which a plastic preform can be expanded to form a plastic container. The invention further relates to a method for shaping plastic preforms into plastic containers within a clean room. At least two-part blow molds for shaping plastic preforms into plastic containers, the parts of which are movable relative to one another, are known from the prior art.

In the closed state, such blow molds are associated with the problem that a gas is arranged between the inner side of the blow mold and the preform to be expanded in the blow mold. Expansion of the preform must take place against the pressure which this gas exerts on the outer walls of the preform. In the simplest case, the gas can be discharged through openings in the blow mold to an outer side of the blow mold. However, this is not always readily possible. For example, blow molds are known in which the closing of the blow mold and permanent fixing of the blow mold parts, which are moved relative to one another, is realized by pressure pads which apply pressure to the blow mold parts from the outside and provide a counter pressure to the blow pressure. This can prevent that, toward the end of each blow molding process, when the blow pressure must be particularly high, the blow mold parts are displaced relative to one another by the blow pressure acting from the inside, and that the formed containers do not have the desired shape or are even defective. However, the pressure pads that seals the outer side in a planar manner make it difficult to discharge the excess gas from inside the blow mold.

Discharging the gas from inside the blow mold is difficult even when shaping preforms into containers under aseptic conditions, since the lines necessary for this purpose are at least temporarily open relative to the interior of the blow mold and therefore must also be germ-free. Ensuring sterility of gas discharge lines is particularly difficult when long lines are necessary, for example in order to conduct the gas around a pressure pad.

Accordingly, there is the problem of providing a blow mold which facilitates the removal of the gas present between the inner side of the blow mold and a preform under sterile conditions. The necessary lines should be easily accessible and easy to sterilize.

SUMMARY OF THE INVENTION

An essential aspect of the invention is thus a blow mold for shaping plastic preforms into plastic containers having a first side part and a second side part, which are movable relative to one another and, in an assembled state, enclose a cavity at least in sections, within which a plastic preform can be expanded to form a plastic container. According to the invention, the first and/or second side part has at least one first channel which is suitable and provided for conveying a fluid and extends from an inner surface defining the cavity to an opposite outside surface. It furthermore has a second channel which is in fluid connection with the first channel and extends at least in sections along the outside surface of the first and/or second side part, wherein the first channel and/or the second channel in a state of the blow mold, in which shaping of a plastic preform into a plastic container within the blow mold is possible, is in fluid connection with a clean room at least on one side. In this state, the first channel and/or the second channel is preferably in fluid connection with a clean room on both sides.

This configuration of the channels makes it possible to discharge the fluid, preferably a gas, from the volume between the plastic preform and the inner surface of the closed blow mold onto an outer side of the blow mold or a side part through the first channel. Such a first channel can be very short, since it only has to extend through a wall of the side part. Typically, such a wall has a thickness that is significantly below 50 mm, usually in the range of about 10-25 mm. Such a route can be easily sterilized or kept sterile, for example by spraying in a sterilization agent.

Accordingly, it is preferred for the first channel to be a penetration, preferably a bore through a wall of the first and/or second side part, which wall at least partially surrounds the cavity.

In order to also provide a simple way of applying a sterilization agent to the second channel in a simple manner, it is preferred for the second channel to be an open channel which is preferably designed as a depression in an outside surface of the first and/or second side part. In this context, "open channel" does not mean that the channel is open at its longitudinal ends, but that one side and/or side wall is open at least in sections. The channel is thus preferably designed as a depression, for example a furrow, in an outside surface of the first and/or second side part. If such a side part is inserted into a blow mold carrier, the blow mold carrier can preferably act as a side wall of the second channel and close the latter laterally.

Since flexible materials such as, for example, a pressure pad could be partially pressed into the (laterally open) second channel depending on flexibility, it is preferred for the side part preferably in the closed state not to be held in the desired position by means of a (flexible) pressure pad. The blow mold is thus preferably configured without a pressure pad. This means that the attachment of a pressure pad, for example between a blow mold carrier (part) and a side part, is dispensed with. Rather, positionally stable securing of the two side parts relative to one another, which is usually ensured by the pressure pad, is carried out by a locking mechanism as described further below. Preferably, during locking by means of such a locking mechanism, the locking movement of the side parts also brings about further movement of the side parts toward one another and securing of the side parts in this position relative to one another during the blow molding process.

In a preferred embodiment, the first and/or second side part has multiple first channels and/or second channels. As a result, a faster and more uniform outflow of the fluid from the internal volume of the closed blow mold can be made possible. It is particularly preferred for multiple first channels to be in fluid connection with a second channel. For example, a second channel could extend in sections along an outer surface of a side part and be connected at several points to first channels which are designed, for example, as bores through the side part.

Preferably, the at least one second channel extends along a circumferential direction of a side part and/or the (closed) blow mold. It is particularly preferred for several second channels to extend along a circumferential direction of a side part and/or the (closed) blow mold. These second channels could run substantially parallel to one another. A sufficiently large volume flow from the closed blow mold can thus be ensured in combination with the above-mentioned multiple first channels, which open into a, preferably each, second channel. At the same time, the volume flow through the many first channels which open at different positions in the interior of the closed blow mold can be ensured in that a homogeneous outflow of the fluid through the side parts is possible. This can avoid undesired, uneven deformations of the preform during the shaping process which occur due to local pressure fluctuations inside the blow mold.

In a preferred embodiment, the first and/or second side part has multiple first channels and/or second channels. As described above, this can allow for a homogeneous outflow of the fluid from the volume between the inner side of the blow mold and the outer side of the preform during its expansion to a container within the closed blow mold. In order to enable the fluid to flow out particularly homogeneously, it is preferred for each of these channels to be spaced apart from the closest channel not more than 100 mm, preferably 90 mm, further preferably 80 mm and particularly preferably 75 mm.

The blow mold, which can generally also be referred to as a shaping station, preferably also has a base part carrier for carrying a base part of the blow mold. These side parts and the base part of the blow mold together form a cavity within which the plastic preforms can be shaped into the plastic containers by applying a flowable medium and in particular compressed air to them.

The side parts are preferably pivotable relative to one another with respect to a predetermined pivot axis. As a result, it is possible for the side parts to be unfolded in a book-like manner and for a preform to be introduced into the cavity through the opening formed during unfolding.

In a preferred embodiment, the blow mold has a locking mechanism in order to fix the two side parts relative to one another (on the side facing away from the pivot axis) in a closed state of the blow mold. For this purpose, the side parts themselves are preferably not locked relative to one another, but instead side part carriers, wherein each side part carrier preferably carries a side part. Preferably, such a locking mechanism has a first locking element which is pivotable with respect to a predetermined pivot axis and which engages with a second locking element in order to lock the side part carriers.

Preferably, the first locking element is pivotable eccentrically with respect to the predetermined pivot axis. As a result, the pivoting movement also brings about a longitudinal displacement of the locking element, which preferably leads to the first locking element being pulled back with respect to the pivot axis after engagement of the first locking element with the second locking element, and the second locking element thus also being pressurized in the direction of the pivot axis. As a result, reliable securing of the two side parts with respect to one another, which counteracts the internal or blowing pressure, can be ensured possibly even without a pressure pad.

In a preferred embodiment, at least the first or second side part, preferably the first and second side part each, has a fastening section to which an adapter element can be releasably attached. Such an embodiment makes it possible to use a blow mold or the side part(s) in a particularly flexible manner, since it can be adapted to certain requirements depending on the design of the releasable adapter element. Preferably, the side part can fulfill its function as a limitation of a space for the expansion of a preform to form a container during a blow molding process even without an adapter element arranged in the fastening section.

Such an adapter element preferably allows for at least one side part to be exchanged fully automatically and/or semi-automatically. In a preferred embodiment, the adapter element can thus be fixable and/or releasable pneumatically relative to a blow mold carrier. This embodiment makes it possible for the blow mold or the blow mold parts, such as for example the side parts, not to be manually released from the blow mold carrier when a blow mold is exchanged. Also, the parts of a blow mold having a different container geometry do not have to be fixed manually in the blow mold carrier. Instead, it is possible for locking (and release or unlocking) to take place automatically, for example by a pneumatic displacement of a latch.

In a further additional or alternative embodiment, the adapter element can be gripped by a robot device for releasing and/or fixing the side part relative to a blow mold carrier. In this embodiment, not only can the fixing and releasing of the side part relative to a blow mold carrier take place without tools and without the direct intervention of a user, but also the insertion of the side part into, and its removal, from the blow mold carrier.

Preferably, the first and/or second side part has at least one fastening means and/or adapter element for connecting the side part to a blow mold carrier, said fastening means and/or adapter element preferably being sealed with respect to at least one of the first and/or second channels, preferably with respect to all first and/or second channels, by means of a sealing element. Such a sealing element between the fastening means and at least one of the first and/or second channels can ensure that, in particular in the case of a pneumatically releasable fastening means, the fastening means is unintentionally triggered by fluid exiting from one of the channels. In addition, it can be ensured that even if the fastening means is not located within the clean room, no contaminants can reach the channels, and thus the clean room, from the fastening means.

In a preferred embodiment, the fastening means and/or adapter element is releasable and/or lockable relative to the blow mold carrier for an automated blow mold exchange, preferably a blow mold exchange that can be carried out by a blow mold exchange robot. As described above, this can be realized, for example, via corresponding contact elements of an adapter device which can be gripped by a gripping device of a robot. In addition or as an alternative to this embodiment, it is also possible for corresponding contact elements to be provided directly on a blow mold part or side part. In this embodiment, the robot can grip the blow mold part by means of a gripping device even if no adapter element has been provided. A contact element preferably has a geometry which enables secure gripping by the robot. As shown in connection with FIG. 1, it can be, for example, one or more projections shaped, for example, as a mushroom. Other geometries can also be advantageous for certain applications or robots, with positively interlocking geometries of the gripping device of the robot and the blow mold being preferred. They are preferably selected from a group comprising latching elements, projections, sawtooth structures, angle elements and combinations thereof. However, other geometries and/or operative connections such as, for example, a planar surface which can serve as a complementary contact surface for a suction cup or vacuum lifter of the robot are also conceivable.

The first and/or second side part preferably has at least one machine-readable data storage element. This makes it possible for a robot to unambiguously identify the side part to be gripped or at least the type of side part to be gripped. As a result, it can be avoided that a blow mold which does not fit the geometry of the preform to be treated and/or of the container to be produced is inserted into the blow mold carrier. Even if such an unsuitable blow mold had been used, it could be identified unambiguously and preferably contactlessly due to the data storage element.

The data storage element is preferably selected from a group comprising a non-volatile memory, an RFID marking, an optical 2D code, preferably a QR code, DataMatrix code, Han-Xin code, JAB code, Maxi code, DotCode or Aztec code, optical one-dimensional code, preferably a barcode, EAN-X, UPC-X or 2/5 Interleaved, and a three-dimensional code, preferably projections and/or depressions in an identification region of the first and/or second side part. As explained above, the robot or another checking device can clearly recognize due to such code whether a suitable blow mold is arranged in a blow mold carrier. With regard to the above-mentioned coding by means of a three-dimensional code comprising projections and/or depressions, it may be advantageous for this code to simultaneously form a contact point of the blow mold part, which contact point is contacted by a gripping element of the robot. If the three-dimensional structure of the contact element is not compatible with a gripping element of the robot, it cannot be gripped by the robot and the blow mold part may thus be identified as unsuitable.

The fastening means is preferably in a state of the blow mold in which shaping of a plastic preform into a plastic container within the blow mold is possible, in fluid connection with a clean room. In this embodiment, the fastening means can be surrounded by the fluid arranged in the clean room.

Therefore, it is preferred for the fastening means to be sterilizable, i.e., in particular, designed for multiple thermal and/or chemical treatments (for example with an $H_2O_2$ solution and/or temperature application). In this embodiment, the robot could also be arranged within the clean room in order to alternate between different blow molds which are inserted in a blow mold carrier, and could hold available several sets of different blow molds within the clean room, so that a set can be exchanged without opening the clean room.

In a further preferred embodiment, the blow mold can be attached directly to the blow mold carrier. In this embodiment, it is therefore proposed for the blow mold and, in particular, for the side part(s) of the blow mold to be attached and/or attachable to the blow mold carrier directly and, in particular, without a pressure pad located between the blow mold carrier and the side part.

The present invention further relates to a method for shaping plastic preforms into plastic containers within a clean room. This method is characterized by the following steps:

- inserting a preform into a blow mold having a first side part and a second side part, which can be moved relative to one another,
- guiding the first side part and the second side part toward each other up to an assembled state in which a cavity encloses the plastic preform,
- introducing a medium into an inner volume of the plastic preform and expanding the plastic preform to form a plastic container, wherein a fluid arranged in the cavity between an outer wall of the plastic preform and an inner wall of the first and/or second side part flows out through a first channel, which extends from an inner surface of the first and/or second side part defining the cavity to an opposite outside surface of the first and/or second side part, and is discharged into the clean room via a second channel which is in fluid connection with the first channel and extends at least in sections along the outside surface of the first and/or second side part.

This method allows a particularly simple outflow of the fluid from the volume between the inner wall of the blow mold and the outer wall of the preform during the latter's shaping in the closed blow mold.

Disinfection and/or sterilization of the channels can be carried out particularly easily. The interior of the second channel, in particular, is easily accessible for a sterilization medium when the channel is designed as an open channel such as, for example, a depression or furrow in the outside surface of the first and/or second side part. If the side part is released from a blow mold carrier, the interior of the second channel is exposed at least in sections and can preferably be subjected to the sterilization medium over the entire length of the channel.

Sterilization of the first channel is usually easier to realize since its length is often smaller and corresponds only to the thickness of the side part (along the radial direction of the preform to be shaped inside the blow mold). Preferably, the first channel extends along the radial direction of the preform to be shaped inside the blow mold.

The method is intended in particular to use a blow mold as described above and, in particular, to shape a preform in such a blow mold to form a container and/or to arrange such a blow mold in a blow mold carrier. Therefore, method steps which deal with providing or developing the features described above in connection with the device are intended to be covered by the disclosure.

Similarly, the blow mold preferably has all necessary components in order to carry out the above-described method and is, in particular, configured to carry out individual or several method steps described in the context of the above method individually or in combination with one another.

Further advantages and embodiments result from the accompanying drawings.

BRIEF DESCRIPTION OF THE INVENTION

Figure 2A:
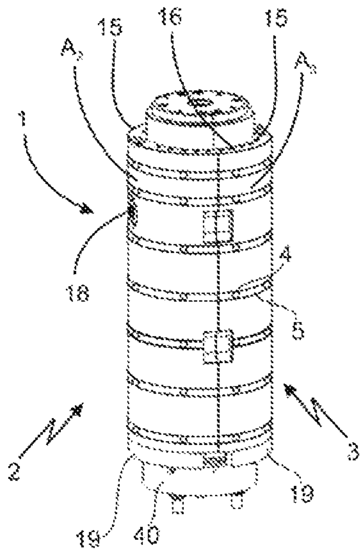
Figure 2B:
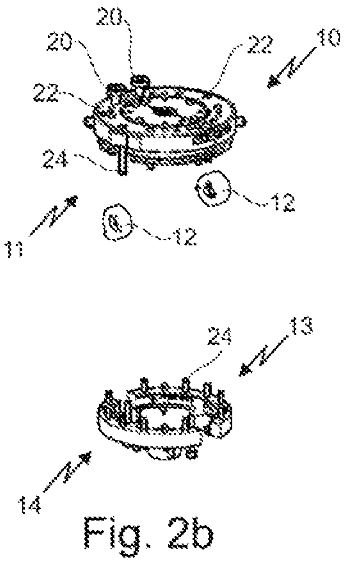
Figure 3A:
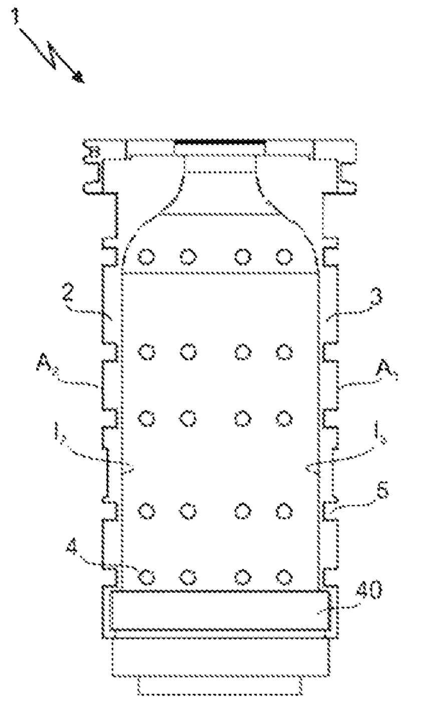
Figure 3B:
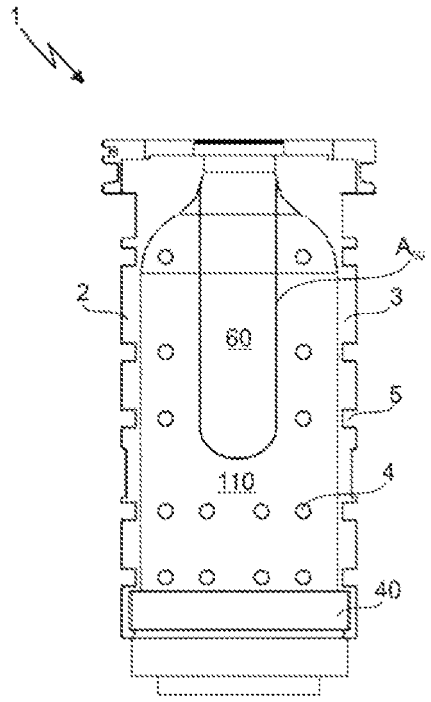

In the figures:

FIG. 1 shows a schematic illustration of a blow mold in a closed state;

FIG. 2*a* shows yet another schematic illustration of a blow mold in a closed state;

FIG. 2*b* shows a schematic illustration of adapter elements to be attached to a blow mold;

FIG. 3*a* shows a sectional view of a blow mold 1 in the closed state;

FIG. 3*b* shows a sectional view of a blow mold 1 in which a preform is shown as well.

DETAILED DESCRIPTION OF THE INVENTION

FIG. 1 shows a schematic illustration of a blow mold 1 in a closed state. Plastic preforms can be expanded to form plastic containers in a cavity (not shown) enclosed by the blow mold 1. The blow mold 1 comprises a first side part 2 and a second side part 3, which can be moved relative to one another in order to open or close the blow mold. The blow mold 1 is closed in the example shown, and the two side parts 2, 3 abut against each other at the contact point 6. When open, the two side parts 2, 3 contact at least not along the entire contact surface 6.

In the example shown, both the first and the second side part have multiple first channels 4 suitable and provided for conducting a fluid. These first channels extend from an inner surface defining the cavity to an opposite outside surface $A_2$, $A_3$. Each of the first channels 4 opens into one of the multiple second channels 5, which are thus in fluid connection with at least one first channel 4. The second channels 5 extend, at least in sections, along the outside surface $A_2$, $A_3$ of the first and/or second side part.

In the closed state of the blow mold 1, in which shaping of a plastic preform (not shown in this figure) to form a plastic container within the blow mold is possible, each first channel 4 (possibly via one or more second channels 5) and each second channel is in fluid connection with a clean room 100 at least on one side. This fluid connection also exists when the first and the second side part are arranged in a blow mold carrier (not shown). Such a blow mold carrier contacts an outside surface $A_2$, $A_3$ of the first and/or second side part 2, 3 and preferably also delimits one or more second channels 5, at least in sections, in their radial extension. The blow mold carrier thus preferably forms a radially outside wall of the second channel 5, which in the example shown is designed as a depression, groove or furrow in the outside surface $A_2$, $A_3$ of the first and/or second side part 2, 3.

The connection of the second channel 5 to the clean room 100 can be ensured in that a corresponding hollow or bore in the blow mold carrier provides a fluid connection to the clean room.

The blow mold shown in FIG. 1 is equipped with adapter elements 10, 11 and 12. Such adapter elements 10-12 make it possible to optionally equip a blow mold 1 such that it cannot only be placed by a user (possibly by means of tools) in a blow mold carrier, but that the fixing of the blow mold 1 in a blow mold carrier takes place via at least one of the adapter elements 10-12, which can preferably be fixed without tools in a corresponding receptacle of the blow mold carrier. Fixing of the adapter element in the blow mold carrier can take place, for example, via the adapter element 12, which, when pneumatically activated, is held in a corresponding receptacle of the blow mold carrier. The adapter elements can therefore also serve as fastening means for fastening the blow mold in a blow mold carrier.

The adapter elements 10 and 11 shown in FIG. 1 are designed as separate adapter elements 10, 11 so that they can be moved relative to one another together with the side parts 2, 3, for example in order to open the blow mold. FIG. 1 further shows reception regions 13, 14, in which a further adapter element pair 13, 14 (not shown in FIG. 1) can be inserted.

In the example shown, the adapter element pair 10 and 11 has contact elements 20 which can be gripped by a gripping device of a robot. In the example shown, these contact elements 20 are each arranged on the adapter elements 10 or 11 and can thus be connected to the blow mold 1, if necessary. The contact elements 20 enable a gripping device (not shown) of a set-exchanging robot to pick up the side parts 2, 3 and remove them from the blow mold carrier or insert them into the latter. The geometry of the contact elements 20 can be characteristic of a specific blow mold geometry so that, for example, only those blow molds 1 which correspond to a predetermined geometry can be picked up and held by a gripping device of a robot that is designed to be complementary to the contact elements 20.

FIG. 1 further shows a sealing element 30 which can, at least in sections, seal a fastening means 18 for fastening the blow mold in a blow mold carrier, here by means of the adapter element 12, relative to the clean room. It can thus be achieved that the fastening means 12 itself is not arranged in the clean room and therefore also does not have to meet the particular requirements with regard to resistance to the repeated application of sterilization agents and/or temperature.

Reference sign 40 designates a base carrier which closes the blow mold 1 in the region of the container base to be formed in the closed state.

FIG. 2*a* shows yet another schematic illustration of a blow mold 1 in a closed state. As in FIG. 1, the first 4 and second channels 5 of both side parts 2, 3 can be seen. The channels 5 extend on the outer surfaces $A_2$, $A_3$ of these two side parts 2, 3, wherein the channels 5 are open on the radially outer side, so that the first channels 4 formed as bores in the radially inner walls of the second channels 5 can be seen.

In the illustration according to FIG. 2*a*, the blow mold 1 is shown without adapter elements 10-14. In the fastening regions 15, 19, in which the adapter element pairs 10 and 11 or 13 and 14 can be arranged, the receptacles 16 (preferably screw threads) can be seen, which can accommodate fastening means for fastening the adapter elements 10, 11, 13, 14 such as screws, for example. In this embodiment too, the blow mold 1 can be fixed in a blow mold carrier (not shown). To this end, the fastening element 18 must usually be fixed by a user in the blow mold using a suitable tool.

Couplings, for example, can be arranged on the fastening element 18, which enable, for example, parts of the blow mold 1 and, in particular, the blow mold 1 to be automatically released from the blow mold carrier.

In FIG. 2*a*, too, reference sign 40 designates a base carrier which seals the blow mold in the region of the container base to be formed in the closed state.

FIG. 2*b* is a schematic view of adapter elements 10-14 for attachment to a blow mold 1 as shown in FIG. 2*a*. The adapter elements 10 and 13 are each configured and provided for fastening to side part 3, whereas the adapter elements 11 and 14 are configured and provided for fastening to side part 2. These adapter elements 10 and 11 as well as 13 and 14 are in each case preferably designed substantially semicircular so that the adapter element pairs 10 and 11 as well as 13 and 14, when attached to the blow mold, in each case enclose a section of the blow mold in a circular manner in the closed state.

In order to fasten the adapter elements 10, 11, 13 and 14 to the respective side parts 2, 3 or in the fastening regions 15, 19, bores 22 are provided which can be brought into overlap with the bores 16 in the associated blow mold parts 2, 3, and can serve, for example, for attaching a screw fastening. In order to simplify the alignment of the bores 22 and 16, centering pins 24 are provided which can engage in corresponding recesses 16 in the first and/or second side part 2, 3 or in their fastening regions 15, 19.

Reference sign 12 designates a further adapter element which is arranged in particular on the fastening section 18 that is located on the outer circumference of the blow mold 1 or of the two side parts 2, 3. Fastening mechanisms, in particular, can be automatically (preferably pneumatically) closed and/or released by means of this adapter element 12.

FIG. 3*a* shows a sectional view of a blow mold 1 in the closed state. It has two side parts 3 and 3 as well as a base part 40. This base part 40 is held by the two side parts, which can take place in particular by means of a form fit. Fixing means for holding the base part 2 are integrated in each of the side parts 2, 3.

FIG. 3*a* also shows the first channels 4 designed as bores, which open out on the inner sides $I_2$ and $I_3$ of the two side parts 2, 3. Also, depressions which form the second channels can be seen on the outer sides $A_2$ and $A_3$ of both side parts 2, 3.

FIG. 3*b* also shows a preform 60 by which the volume 110 is defined that is arranged between its outer side $A_{60}$ and the inner sides $I_2$ and $I_3$ of the two side parts 2, 3. When the preform 60 expands to form a container which in the radial direction comes up to the inner sides $I_2$ and $I_3$ of the two side parts 2, 3, the entire fluid which was previously arranged in said volume 110 must be discharged. This can be done in a particularly low-resistance and homogeneous manner via the plurality of first and second channels 4, 5.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

LIST OF REFERENCE SIGNS

1 Blow mold
2 First side part
3 Second side part
4 First channel
5 Second channel
6 Contact point, contact surface
10, 11, 12, 13, 14, Adapter elements
15 Fastening region
16 Receptacle, screw thread, bore
18 Fastening section, fastening means, fastening element
19 Fastening region, fastening section
20 Contact element, projection
22 Bore
24 Centering pin
30 Sealing element
40 Base carrier
60 Preform
100 Clean room
110 (Fluid) volume (to be displaced)
$I_2$, $I_3$ (Radially) inside surface of the side parts,
$A_2$, $A_3$ (Radially) outside surface of the side parts,
$A_{60}$ (Radially) outside surface of the preform

The invention claimed is:

1. A blow mold for shaping plastic preforms into plastic containers having a first side part and a second side part, which are movable relative to one another and, in an assembled state, enclose a cavity at least in sections, within which a plastic preform can be expanded to form a plastic container, wherein the first and/or second side part has at least one first channel which is configured for conveying a fluid and extends from an inner surface defining the cavity to an opposite outside surface, and a second channel which is in fluid connection with the first channel and extends at least in sections along the outside surface of the first and/or second side part, wherein the first channel and/or the second channel in a state of the blow mold, in which shaping of a plastic preform into a plastic container within the blow mold is possible, is in fluid connection with a clean room at least on one side, wherein at least the first or second side part has a fastening section to which an adapter element can be releasably attached, wherein the adapter element allows for at least one side part to be exchanged fully automatically and/or semi-automatically, wherein the adapter element can be fixed and/or released pneumatically relative to a blow mold carrier, and wherein the first and/or second side part has at least one fastener for connecting the side part to the blow mold carrier, wherein said adapter element is arranged on a fastening section that is located on the outer circumference of the blow mold, the first side part, or the second side part, wherein the adapter element is sealed with respect to at least one of the first and/or second channels.

2. The blow mold according to claim 1, wherein the first channel is a penetration through a wall of the first and/or second side part, which wall at least partially surrounds the cavity.

3. The blow mold according to claim 1, wherein the second channel is an open channel which is designed as a depression in an outside surface of the first and/or second side part.

4. The blow mold according to claim 1, wherein the first and/or second side part has multiple first channels and/or second channels, wherein multiple first channels are in fluid connection with a second channel.

5. The blow mold according to claim 1, wherein the adapter element can be gripped by a robot device for releasing and/or fixing the side part relative to a blow mold carrier.

6. The blow mold according to claim 1, wherein the adapter element is releasable and/or lockable relative to the blow mold carrier for an automated blow mold exchange, and/or the first and/or second side part has at least one machine-readable data storage element which is selected from a group comprising a non-volatile memory, an RFID marking, an optical 2D code, Data-Matrix code Han-Xin code, JAB code, MaxiCode, DotCode or Aztec code, optical one-dimensional code EAN-X, UPC-X or 2/5 Interleaved, and a three-dimensional code.

7. The blow mold according to claim 1, wherein the blow mold can be fastened directly to a blow mold carrier, and no pressure pad is located between the blow mold and the blow mold carrier.

8. The blow mold according to claim 1, wherein the first and/or second side part has multiple first channels and/or second channels, wherein each of these channels is spaced apart from the closest channel not more than 100 mm.

9. A method for shaping plastic preforms into plastic containers within a clean room, comprising the steps of inserting a preform into a blow mold as claimed in claim 1, having a first side part and a second side part, which can be moved relative to one another, guiding the first side part and the second side part toward each other up to an assembled state in which a cavity encloses the plastic preform, introducing a medium into an inner volume of the plastic preform and expanding the plastic preform to form a plastic container, wherein a fluid arranged in the cavity between an outer wall of the plastic preform and an inner wall of the first and/or second side part flows out through a first channel, which extends from an inner surface of the first and/or second side part defining the cavity to an opposite outside surface of the first and/or second side part, and is discharged into the clean room via a second channel which is in fluid connection with the first channel and extends at least in sections along the outside surface of the first and/or second side part, wherein at least the first or second side part has a fastening section to which an adapter element can be releasably attached, wherein the adapter element allows for at least one side part to be exchanged fully automatically and/or semi-automatically, wherein said adapter element is fixed and/or released pneumatically relative to a blow mold carrier, and wherein the first and/or second side part is connected to the blow mold carrier by least one fastener, and said adapter element is arranged on a fastening section that is located on the outer circumference of the blow mold, the first side part, or the second side part, wherein the adapter element is sealed with respect to at least one of the first and/or second channels.

* * * * *